Dec. 20, 1927.
T. H. THOMAS
1,653,136
FLUID PRESSURE BRAKE
Filed April 11, 1927
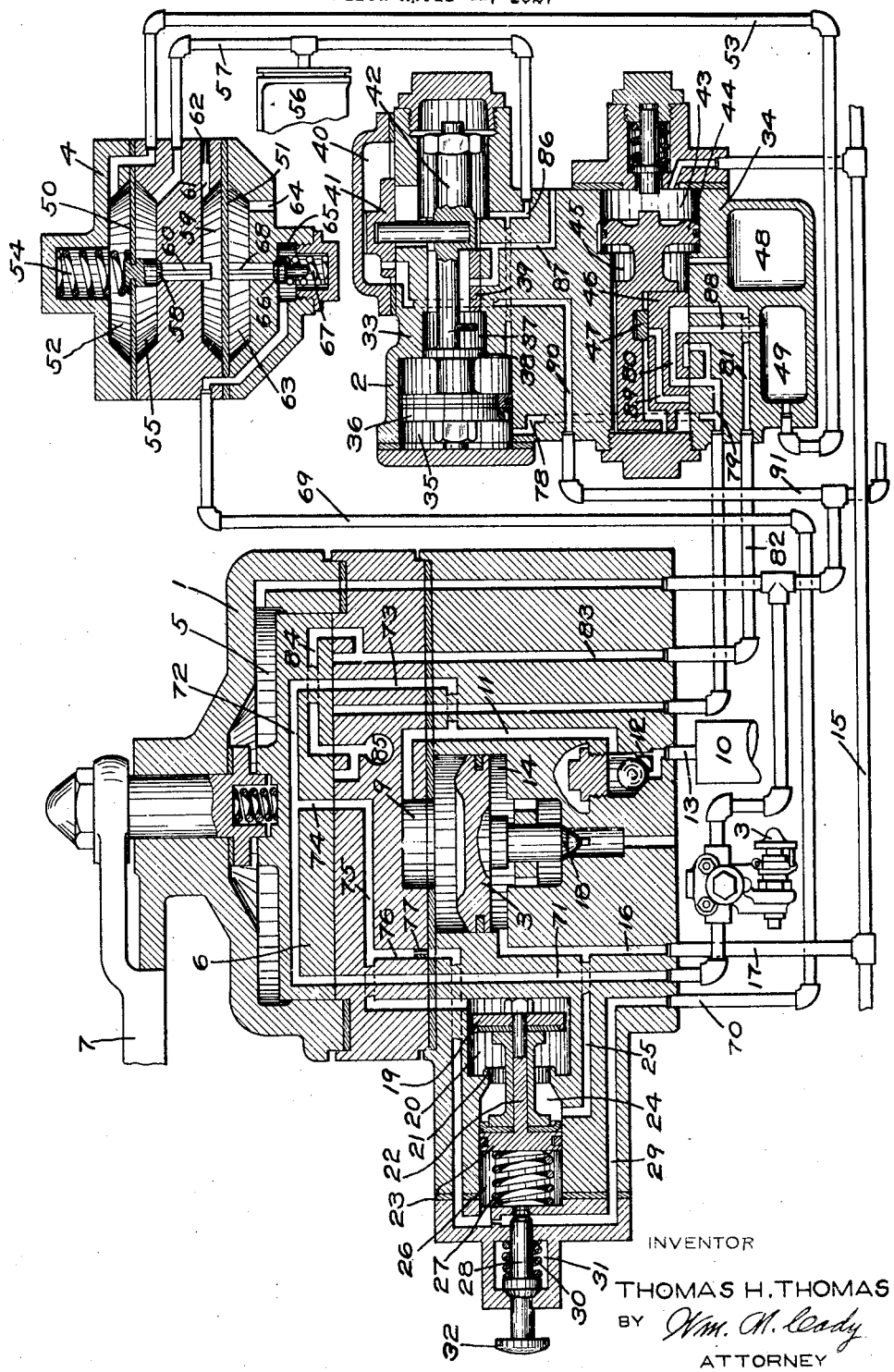
INVENTOR
THOMAS H. THOMAS.
BY Wm. H. Cady
ATTORNEY Patented Dec. 20, 1927.

1,653,136

UNITED STATES PATENT OFFICE.

THOMAS H. THOMAS, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

FLUID-PRESSURE BRAKE

Application filed April 11, 1927. Serial No. 182,744.

This invention relates to fluid pressure brakes, and more particularly to the brake control equipment on the locomotive.

In the usual locomotive fluid pressure brake equipment the automatic brake valve device is normally carried in running position, while the brakes are held released, and when the brake valve device is in this position, fluid under pressure is supplied to the brake pipe through a feed valve device, to maintain the pressure in the brake pipe at a predetermined degree.

If, when the brakes are in release position, a sudden or emergency reduction in brake pipe pressure is initiated somewhere in the train, other than by the operation of the automatic brake valve device, this reduction will be propagated serially throughout the train by the well known quick serial action, and the brakes will be applied. Under such a condition, if the brake valve device is not moved from the running position to lap position, so as to cut off the flow of fluid to the brake pipe, the brakes on the locomotive and on cars at the head of the train are liable to be released by the continued flow of fluid to the brake pipe.

The principal object of my invention is to provide means for automatically cutting off the flow of fluid to the brake pipe at the brake valve device after an emergency reduction in brake pipe pressure has been produced, thereby preventing an undesired releasing of the brakes.

Another object of the invention is to provide means whereby an emergency reduction in brake pipe pressure will automatically cause the flow of fluid to the brake pipe to be cut off and whereby under any service reduction in brake pipe pressure the flow of fluid to the brake pipe will not be cut off.

In the accompanying drawing, the single figure is a diagrammatic sectional view of a brake control equipment, embodying my invention.

The apparatus shown in the drawing includes a brake valve device 1, a distributing valve device 2, the usual feed valve device 3 and a cut off control valve device 4.

The brake valve device 1 preferably comprises a casing having a valve chamber 5, containing the usual rotary valve 6 which is adapted to be operated through the medium of a handle 7. Included in the casing, is the usual equalizing discharge valve mechanism comprising a piston 8, having the chamber 9 at one side thereof connected to the equalizing reservoir 10 through a passage 11, choke 12, and pipe 13. At the opposite side of the piston 8 the chamber 14 is connected with the brake pipe 15 through a passage 16 and branch pipe 17. The piston 8 is adapted to operate a discharge valve 18 for controlling the venting of fluid from the brake pipe 15.

Also included in the brake valve device casing, is a cut-off valve mechanism comprising a valve 19 contained in a chamber 20 and adapted, in one position, to seal against a seat ring 21. The valve 19 is connected with the stem 22 of a piston 23, at one side of which piston there is a chamber 24 connected to the brake pipe 15 through a passage 25, passage 16 and branch pipe 17. At the opposite side of this piston there is a chamber 26 containing a spring 27 which acts upon the piston. There is also a double beat valve 28 adapted, in one position to close communication between chamber 26 and a passage 29, and in the opposite or normal position, in which it is held by the pressure of a spring 30 contained in a chamber 31, to seat so as to prevent leakage from this chamber to the atmosphere. This valve 28 has an extended stem provided with an enlarged outer end portion 32 by which the valve is manually operated.

The distributing valve device 2 comprises a casing having the usual application portion 33 and equalizing portion 34.

The distributing valve application portion 33 comprises a casing having an application cylinder 35 containing an application piston 36, a valve chamber 37 separate from the piston chamber at the right of the application piston 36 by piston 38 and containing an exhaust valve 39, and also has a valve chamber 40 containing an application valve 41, both of said valves being operated by the movement of the piston stem 42.

The equalizing portion 34 of this distributing valve device, comprises a casing having a piston chamber 43 containing an equalizing piston 44, and a valve chamber 45 containing a main slide valve 46 and an auxiliary slide valve 47 adapted to be operated by said piston. The casing also contains the usual pressure chamber 48 and application chamber 49.

The cut-off control valve device 4 may comprise a casing having flexible diaphragms 50 and 51 mounted therein, the chamber 52 at one side of the diaphragm 50, being connected with the application chamber 49 of the equalizing portion 34 of the distributing valve device, by a pipe 53 and containing a spring 54 which acts upon the diaphragm 50. The chamber 55 at the other side of the diaphragm 50 is connected with the brake cylinder 56 and chamber 37 of the application portion 33 of the distributing valve device, by a pipe 57, and contains a valve 58 for controlling a communication between the chamber 55 and a chamber 59 at one side of the diaphragm 51. The valve 58 is secured to the diaphragm 50 and has a fluted stem 60, past which, fluid may flow from the chamber 55 to the chamber 59, the chamber 59 being open to the atmosphere through a passage 61 containing a choke plug 62. The chamber 63, at the other side of the diaphragm 51, is open to the atmosphere through a port 64 and is adapted to communicate with a chamber 65 in the casing, such communication being controlled by a valve 66 contained in the chamber 65 and which is acted upon by a spring 67 which tends to maintain the valve closed. This valve has a fluted stem 68 which is adapted to engage with the under side of the diaphragm 51. The chamber 65 is connected with the cut-off valve device of the brake valve device by a pipe 69.

Assuming the brake valve device to be in running position as shown in the drawing, and the train brakes released, fluid at the reduced pressure supplied by the feed valve device 3, flows through a pipe 70, passage 71 in the brake valve device, cavity 72 in the rotary valve 6 and then through passages 73 and 11 to chamber 9 at one side of the equalizing piston 8, and also through the passage 11, choke 12 and pipe 13 to the equalizing reservoir 10. Fluid at feed valve pressure also flows to valve chamber 20, through the cavity 72 in the rotary valve 6, a port 74 in this valve, and a passage 75, and also from passage 75 through a passage 76 containing a choke plug 77 into the spring chamber 26 of the cut-off valve mechanism, which chamber in turn is connected, through the passage 29 and pipe 69, with the chamber 65 of the cut-off control valve device. In initially charging the brake system, the spring 67 will hold the valve 66, of the cut-off control valve device 4, closed so that fluid supplied to the chamber 65 cannot escape to the atmosphere by way of the chamber 63 and port 64, and valve 66 being held closed, the fluid pressure in chamber 26 is permitted to build up to equal that in chamber 20, which permits the spring 27 to shift and hold the piston 23 and valve 19 in the position as shown in the drawing. In this position, fluid at feed valve pressure will flow from the chamber 20 to the chamber 24 and from thence through passages 25 and 16 to the brake pipe 15 and to the equalizing piston chamber 14 and thus charges the brake pipe and chamber 14. As the pressures on both sides of the piston 8 are equalized, the discharge valve 18 is held seated.

With the brake valve device in running position and the equalizing portion 34 of the distributing valve device in release position, the application cylinder 35 is vented to the atmosphere through passages 78 and 79, cavity 80 in the equalizing slide valve 46, passage 81, the usual release pipe 82, passage 83 in the brake valve device, and through cavity 84 in the rotary valve 6 to the exhaust passage 85. When the application cylinder 35 is thus vented, the application piston 36 will be in the position as shown in the drawing and when in this position, the brake cylinder 56, and also chamber 55 in the cut-off control valve device 4 will be vented to the atmosphere through pipe 57, a passage 86 in the distributing valve device, valve chamber 31 and exhaust passage 87. Chamber 52 of the cut-off control valve device being connected by pipe 53 to the application chamber 49, is also vented to the atmosphere in the release position of the equalizing valve device.

When a sudden or emergency reduction in brake pipe pressure is initiated somewhere in the train, said reduction is propagated serially throughout the train in the usual well known manner and when the reduction in pressure reaches the locomotive, the pressure in the brake pipe 15 and piston chamber 43 of the distributing valve device will be suddenly reduced, causing the equalizing piston 44 to be moved, by fluid under pressure in the chambers 45 and 48, to its emergency position. Movement of the equalizing piston to this position, shifts the slide valves 46 and 47 to emergency position in which, fluid under pressure in the valve chamber 45 and pressure chamber 48 flows past the end of the slide valve 46 into passage 79 and then through passage 78 to the application cylinder 35, causing the application piston 36 to move and shift the exhaust slide valve 39 to a position where such valve closes the communication between the valve chamber 37 and passage 87 to the atmosphere, and also shifts the slide valve 41 to such a position as to open the communication between the valve chamber 37 and the valve chamber 40. The chamber 40 being connected by a passage 90 and pipe 91 to the main reservoir (not shown), fluid under pressure from this reservoir flows into valve chamber 40 and then through valve chamber 37, passage 86 and pipe 57 to the brake cylinder 56 and device 4, and the brakes will be applied. Fluid at brake cylinder pressure is also supplied to the chamber 55 and causes the diaphragm 50 and valve 58 to move upwardly, permitting fluid under pressure in the chamber 55 to flow into the chamber 59, and as the exhaust from this chamber 59 is restricted by the choke plug 62, the fluid under pressure in this chamber will build up and cause the diaphragm 51 and valve 66 to be moved downwardly, thus opening the communication between the chambers 59 and 65 and permitting the fluid under pressure in the cut-off valve piston chamber 26 to be vented to the atmosphere through the passage 29, pipe 69, chambers 65 and 63 and port 64. The fluid under pressure in the chamber 26 is vented to the atmosphere at a faster rate than it can be supplied through the choke plug 77, which is interposed between this chamber and the feed valve device 3, so that the feed valve pressure in chambers 20 and 24 operates to shift the piston 23 and valve 19 against the pressure of the spring 27, until the valve 19 seals against the seat ring 21, thus cutting off the communication between the chamber 20, which is connected with the feed valve device 3, and the chamber 24 which is connected with the brake pipe 15, so that even though the brake valve device remains in running position, fluid at feed valve pressure cannot flow to the brake pipe.

To release an application of the brakes, caused as hereinbefore described, and with the brake valve device still in running position, the double beat valve is pushed inwardly, seating the inner valve which closes the communication from the spring chamber 26 to passage 29. Fluid from the feed valve device 3 then flows into this chamber and builds up a pressure sufficient to permit the spring 27 to shift the piston 23 and valve 19 to their open positions, as shown in the drawing, when fluid at feed valve pressure again flows from the chambers 20 and 24 to the brake pipe. When the brake pipe pressure is sufficiently increased, the equalizing piston 44 and slide valves 46 and 47 are shifted to release position, in which position the brakes will be released in the usual manner. It will, however, be noted from the foregoing description that when the application piston 36 is in its release position, the fluid under pressure in the chamber 55 and brake cylinder 56 is vented to the atmosphere, thus permitting the spring 54, which has been compressed, to move the diaphragm 50, of the cut-off control valve device 4, downwardly, seating the valve 58 which closes the communication between the chambers 55 and 59. Fluid under pressure in the chamber 59 will now exhaust to the atmosphere through the passage 61 and choke plug 62, permitting the diaphragm to return to its normal position, as shown in the drawing, which in turn permits the spring 67, which has been compressed, to seat the valve 66, thus closing the communication between the chambers 63 and 65 and preventing fluid under feed valve pressure in the chamber 26 from being vented through these chambers to the atmosphere.

When the brake valve 6 is moved to service position, the brake pipe 15 and piston chamber 43 will be vented to the atmosphere in the usual manner, causing the piston 44 and slide valves 46 and 47 to move to their service positions, in which, fluid under pressure from the pressure chamber 48 in the distributing valve device and valve chamber 45 will flow through a passage 89 in the slide valve 46 and passage 78 to the application piston cylinder 35 and the application chamber 49 and will also flow from the application chamber 49, through pipe 53 to the chamber 52 in the cut-off valve control device 4, thus the pressure in the chamber 52 will be maintained equal to the pressure in the application chamber 49 so that, when the application portion of the distributing valve device is in service position, the brake cylinder pressure in the chamber 55 of the cut-off valve control device will not cause the diaphragm to move upwardly and unseat the valve 58. It will thus be seen that, when a service application of the brakes is effected, the cut-off valve mechanism will not be permitted to operate to cut off the supply of fluid pressure to said brake pipe, nor will it be permitted to operate even when a service overreduction in brake pipe pressure is effected.

Having now described my invention, what I claim as new and desire to secure by Letters Patent, is:—

1. In a fluid pressure brake, the combination with a brake pipe and a brake valve device having means for supplying fluid under pressure to the brake pipe, of a distributing valve device having an application chamber, and means controlled by fluid under pressure in said chamber and operated only upon an emergency reduction in brake pipe pressure for cutting off the supply of fluid under pressure from said brake valve device to said brake pipe.

2. In a fluid pressure brake, the combination with a brake pipe and a brake valve device having a position in which fluid under pressure is normally supplied to the brake pipe to maintain the pressure in the brake pipe at a predetermined degree, of a distributing valve device having an application chamber, and means subject to the pressure in the application chamber and operated only upon an emergency reduction in brake pipe pressure for cutting off the supply of fluid through said brake valve device to the brake pipe.

3. In a fluid pressure brake, the combination with a brake pipe and a brake valve device having means for supplying fluid under pressure to the brake pipe, of a brake cylinder, and means operable by fluid under brake cylinder pressure, upon an emergency reduction in brake pipe pressure, for cutting off the supply of fluid under pressure from said brake valve device to said brake pipe.

4. In a fluid pressure brake, the combination with a brake pipe and a brake valve device having a running position in which communication is established for supplying fluid under pressure to the brake pipe, of means operated upon an emergency reduction in brake pipe pressure for closing said communication, and means for rendering the first mentioned means inoperative when a service reduction in brake pipe pressure is effected.

5. In a fluid pressure brake, the combination with a brake pipe and a feed valve device for supplying fluid under pressure to the brake pipe, of a cut-off valve device for controlling the communication through which said feed valve device supplies fluid to the brake pipe, a control valve device operable upon an emergency reduction in brake pipe pressure for causing said cut-off valve device, to close said communication, and means including a distributing valve device whereby said cut-off valve device and control valve device are rendered inoperative when a service reduction in brake pipe pressure is effected.

6. In a fluid pressure brake, the combination with a brake pipe and a feed valve device for supplying fluid under pressure to the brake pipe, of a cut-off valve device for controlling the communication through which said feed valve device supplies fluid to the brake pipe, a control valve device adapted to control said cut-off valve device for closing said communication, and a distributing valve device operable upon an emergency reduction in brake pipe pressure for causing the control valve to operate, and operable upon a service reduction in brake pipe pressure for rendering said control valve device inoperative.

7. In a fluid pressure brake, the combination with a brake pipe and a feed valve device for supplying fluid under pressure to the brake pipe, of a cut-off valve device for controlling the communication through which said feed valve device supplies fluid to the brake pipe, a distributing valve device having an application portion and an equalizing portion, a control valve device adapted to operate to control the closing of said cut-off valve device, means in said distributing valve device operable upon an emergency reduction in brake pipe pressure to supply fluid under pressure from said application portion to said control valve device for operating said control valve device.

8. In a fluid pressure brake, the combination with a brake pipe and a feed valve device for supplying fluid under pressure to the brake pipe, of a cut-off valve device for controlling the communication through which said feed valve device supplies fluid to the brake pipe, a distributing valve device having an application portion and an equalizing portion, a control valve device adapted to operate to control the closing of said cut-off valve device, means in said distributing valve device operable upon an emergency reduction in brake pipe pressure to supply fluid under pressure from said application portion to said control valve device for operating said control valve device, and means associated with said equalizing portion operable upon a service reduction in brake pipe pressure for rendering said control valve inoperative.

9. In a fluid pressure brake, the combination with a brake pipe, a brake cylinder pipe and a feed valve device for supplying fluid under pressure to the brake pipe, of a cut-off valve device for controlling communication through which said feed valve device supplies fluid to said brake pipe, a cut-off control valve device, a distributing valve device, and means included in said distributing valve device operable upon an emergency reduction in brake pipe pressure for causing fluid under brake cylinder pressure to be supplied to said cut-off control valve device to operate it to control said cut-off valve device.

10. In a fluid pressure brake, the combination with a brake pipe, a brake cylinder pipe and a feed valve device for supplying fluid under pressure to the brake pipe, of a cut-off valve device for controlling communication through which said feed valve device supplies fluid to said brake pipe, a cut-off control valve device, a distributing valve device, means included in said distributing valve device operable upon an emergency reduction in brake pipe pressure for causing fluid under brake cylinder pressure to be supplied to said cut-off control valve device, and means in said cut-off control valve device operable by fluid under brake cylinder pressure for causing said cut-off valve to operate to close said communication.

11. In a fluid pressure brake, the combination with a brake pipe, a brake cylinder pipe and a feed valve device for supplying fluid under pressure to the brake pipe, of a cut-off valve device for controlling communication through which said feed valve device supplies fluid to said brake pipe, a cut-off control valve device, a distributing valve device, means included in said distributing valve device operable upon an emergency reduction in brake pipe pressure for causing fluid under brake cylinder pressure to be supplied to said cut-off control valve device, and means in said cut-off control valve device operable by the fluid under brake cylinder pressure for causing said cut-off valve to operate to close said communication, said distributing valve means when operated by a service reduction in brake pipe pressure being adapted to maintain said cut-off control valve inoperative.

12. In a fluid pressure brake, the combination with a brake pipe and a brake valve device having a position in which fluid under pressure is normally supplied to the brake pipe, of a cut-off valve device for controlling communication through which fluid is supplied from said brake valve device to the brake pipe, an equalizing slide valve device operated upon a reduction in brake pipe pressure for effecting an application of the brakes, and means controlled by said equalizing slide valve device for effecting the operation of said cut-off valve device to close said communication, only when an emergency reduction in brake pipe pressure is effected.

13. In a fluid pressure brake, the combination with a brake pipe and a brake valve device having a position in which fluid under pressure is normally supplied to the brake pipe, of a valve for controlling communication through which said brake valve device supplies fluid to the brake pipe, a piston operated by a variation in fluid under pressure for operating said valve, a distributing valve device, and means controlled by said distributing valve upon an emergency reduction in brake pipe pressure only, for varying the fluid under pressure on said piston.

14. In a fluid pressure brake, the combination with a brake pipe and a brake valve device having means for supplying fluid under pressure to the brake pipe, a valve device for cutting off the supply of fluid under pressure from said brake valve to said brake pipe, a distributing valve device, a control valve device having a valve therein operable by fluid under pressure from said distributing valve device upon an emergency reduction in brake pipe pressure for closing the cut-off valve device.

15. In a fluid pressure brake, the combination with a brake cylinder, a brake pipe and a brake valve device having means for supplying fluid under pressure to the brake pipe, of valve means for controlling communication through which fluid is supplied to the brake pipe by said brake valve device, a valve device having an application chamber, means operated by an increase in pressure in said chamber for effecting an application of the brakes, and a valve device subject to the opposing pressures of the brake cylinder and the application chamber for controlling the operation of said valve means.

16. In a fluid pressure brake, the combination with a brake cylinder, a brake pipe and a brake valve device having means for supplying fluid under pressure to the brake pipe, of valve means for controlling communication through which fluid is supplied to the brake pipe by said brake valve device, a valve device having an application chamber, a distributing valve device having an application chamber, and means subject to the opposing pressures of the brake cylinder and said application chamber for controlling the operation of said valve means.

In testimony whereof I have hereunto set my hand.

THOMAS H. THOMAS.